United States Patent
Xu et al.

(10) Patent No.: US 11,216,971 B2
(45) Date of Patent: Jan. 4, 2022

(54) THREE-DIMENSIONAL BOUNDING BOX FROM TWO-DIMENSIONAL IMAGE AND POINT CLOUD DATA

(71) Applicant: Zoox, Inc., Foster City, CA (US)

(72) Inventors: Danfei Xu, Stanford, CA (US); Dragomir Dimitrov Anguelov, San Francisco, CA (US); Ashesh Jain, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 56 days.

(21) Appl. No.: 16/557,997

(22) Filed: Aug. 30, 2019

(65) Prior Publication Data

US 2020/0005485 A1 Jan. 2, 2020

Related U.S. Application Data

(63) Continuation of application No. 15/797,573, filed on Oct. 30, 2017, now Pat. No. 10,438,371.

(Continued)

(51) Int. Cl.
*G06T 7/00* (2017.01)
*G06T 7/73* (2017.01)
(Continued)

(52) U.S. Cl.
CPC ............ *G06T 7/73* (2017.01); *G06K 9/00201* (2013.01); *G06K 9/00208* (2013.01);
(Continued)

(58) Field of Classification Search
CPC ..... G06T 7/73; G06T 7/11; G06T 7/60; G06T 2207/20164; G06T 2207/30236; G06T 2207/30252; G06T 2210/12; G06T 2210/22; G06T 2207/20084; G06T 2207/20081; G06T 2207/10028; G06T 2200/04; G06K 9/00791; G06K 9/00805; G06K 9/4628; G06K 9/6228; G06K 9/629; G06K 9/6262; G06K 2209/23; G06K 9/00201; G06K 9/00208
See application file for complete search history.

(56) References Cited

U.S. PATENT DOCUMENTS 6,996,505 B1   2/2006  Edelsbrunner et al.
9,881,226 B1   1/2018  Rybakov et al.
(Continued)

OTHER PUBLICATIONS

Qi et al, PointNet Deep Learning on Point Sets for 3D Classification and Segmentation, Arxiv1612.00593v2 Apr. 10 (Year: 2017).*

(Continued)

*Primary Examiner* — Ping Y Hsieh
*Assistant Examiner* — Xiao Liu
(74) *Attorney, Agent, or Firm* — Lee & Hayes, P.C.

(57) ABSTRACT

A three-dimensional bounding box is determined from a two-dimensional image and a point cloud. A feature vector associated with the image and a feature vector associated with the point cloud may be passed through a neural network to determine parameters of the three-dimensional bounding box. Feature vectors associated with each of the points in the point cloud may also be determined and considered to produce estimates of the three-dimensional bounding box on a per-point basis.

20 Claims, 6 Drawing Sheets

Related U.S. Application Data

(60) Provisional application No. 62/562,193, filed on Sep. 22, 2017.

(51) Int. Cl.
| | |
|---|---|
| *G06K 9/00* | (2006.01) |
| *G06K 9/46* | (2006.01) |
| *G06T 7/11* | (2017.01) |
| *G06K 9/62* | (2006.01) |
| *G06T 7/60* | (2017.01) |

(52) U.S. Cl.
CPC ..... *G06K 9/00791* (2013.01); *G06K 9/00805* (2013.01); *G06K 9/4628* (2013.01); *G06K 9/629* (2013.01); *G06K 9/6228* (2013.01); *G06T 7/11* (2017.01); *G06T 7/60* (2013.01); *G06K 9/6262* (2013.01); *G06K 2209/23* (2013.01); *G06T 2200/04* (2013.01); *G06T 2207/10028* (2013.01); *G06T 2207/20081* (2013.01); *G06T 2207/20084* (2013.01); *G06T 2207/20164* (2013.01); *G06T 2207/30236* (2013.01); *G06T 2207/30252* (2013.01); *G06T 2210/12* (2013.01); *G06T 2210/22* (2013.01)

(56) References Cited

U.S. PATENT DOCUMENTS

| | | | |
|---|---|---|---|
| 10,096,122 B1 | 10/2018 | Agrawal et al. | |
| 10,304,191 B1* | 5/2019 | Mousavian | G06T 7/50 |
| 10,438,371 B2* | 10/2019 | Xu | G06T 7/73 |
| 2012/0281907 A1 | 11/2012 | Samples et al. | |
| 2014/0350839 A1 | 11/2014 | Pack et al. | |
| 2015/0009214 A1 | 1/2015 | Lee et al. | |
| 2015/0131924 A1 | 5/2015 | He et al. | |
| 2015/0138185 A1 | 5/2015 | Huang et al. | |
| 2015/0161818 A1 | 6/2015 | Komenczi et al. | |
| 2015/0286893 A1 | 10/2015 | Straub et al. | |
| 2016/0026253 A1 | 1/2016 | Bradski et al. | |
| 2016/0189381 A1 | 6/2016 | Rhoads | |
| 2016/0267326 A1 | 9/2016 | Yagev et al. | |
| 2017/0031056 A1 | 2/2017 | Vega-Avila et al. | |
| 2017/0220887 A1* | 8/2017 | Fathi | G06K 9/00208 |
| 2017/0236037 A1 | 8/2017 | Rhoads et al. | |
| 2017/0250751 A1 | 8/2017 | Kargieman et al. | |
| 2017/0358087 A1 | 12/2017 | Armeni et al. | |
| 2018/0137642 A1 | 5/2018 | Malisiewicz et al. | |
| 2018/0367788 A1 | 12/2018 | Haimovitch-Yogev et al. | |
| 2019/0026597 A1* | 1/2019 | Zeng | G06K 9/00791 |
| 2019/0096086 A1 | 3/2019 | Xu et al. | |

OTHER PUBLICATIONS

Chen et al., "Multi-View 3D Object Detection Network for Autonomous Driving", ARXIV—1611.07004V2, Jul. 31, 2017, pp. 6526-6534.

He et al., "Deep Residual Learning for Image Recognition", retrieved on Mar. 9, 2017 at <<https://arxiv. orgjabs/1512.03385>>, 2016 IEEE Conference on Computer Vision and Pattern Recognition, Dec. 10, 2015, pp. 1-12.

Li, "3D Fully Convolutional Network for Vehicle Detection in Point Cloud", retrieved on May 14, 2018 at <<https:jfarxiv. orgjpdf/1611.08069.pdf>>, 6 pages.

Office action for U.S. Appl. No. 15/797,573, dated Jan. 31, 2019, Xu, "Three-Dimensional Bounding Box From Two-Dimensional Image and Point Cloud Data", 23 pages.

The PCT Search Report and Written Opinion dated Dec. 19, 2018 for PCT Application No. PCT/US2018/049129, 15 pages.

Qi et al., "PointNet: Deep Learning on Point Sets for 3D Classification and Segmentation", IEEE Computer Society Conference on Computer Vision and Pattern Recognition Proceedings, Jul. 31, 2017, pp. 77-85.

Redmon et al., "You Only Look Once: Unified, Real-Time Object Detection", 2016 IEEE Conference on Computer Vision and Pattern Recognition (Cvpr), IEEE, Jun. 26, 2016, pp. 779-788.

* cited by examiner

THREE-DIMENSIONAL BOUNDING BOX FROM TWO-DIMENSIONAL IMAGE AND POINT CLOUD DATA

CROSS-REFERENCE TO RELATED APPLICATION

This application is a continuation of U.S. application Ser. No. 15/797,573, filed Oct. 30, 2017 entitled "Three-Dimensional Bounding Box From Two-Dimensional Image and Point Cloud Data," which is related to U.S. Provisional Application No. 62/562,193, filed on Sep. 22, 2017, entitled "Three-Dimensional Bounding Box From Two-Dimensional Image and Point Cloud Data," all of which is incorporated herein by reference.

BACKGROUND

Multiple applications require information about three-dimensional objects present in an environment. For example, various autonomous systems, such as autonomous vehicles and autonomous drones, utilize three-dimensional data of objects for collision and obstacle avoidance. In order to effectively navigate a three-dimensional environment, such autonomous systems need information about the obstacle, including information about the size and location of the obstacle, for example. Additionally, these systems may require estimates of how such an object interacts with the environment. One such representation of a three-dimensional object is a three-dimensional bounding box. A three-dimensional bounding box may be a simple representation of a three-dimensional object defined by eight corners and having a position, orientation, length, width, and height.

DETAILED DESCRIPTION

Figure 1:
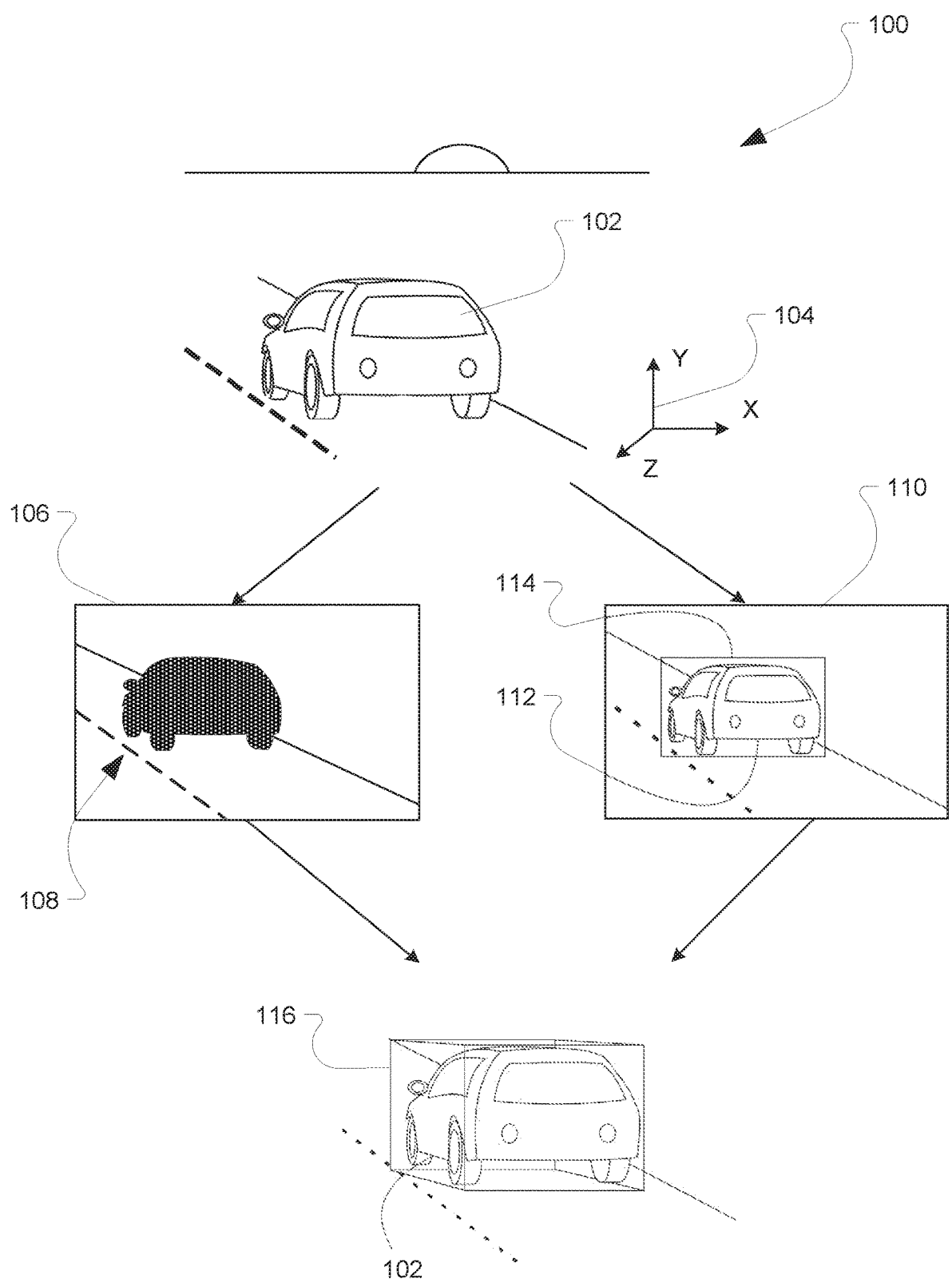
FIG. 1 illustrates an example of an environment, image data and point cloud data associated with the environment, and a three-dimensional bounding box around an object in the environment.

The following detailed description is directed to technologies for estimating three-dimensional bounding boxes that represent objects in an environment. There are various applications which require spatial information of objects present within an environment. As a brief example, many autonomous systems, such as semi- and fully-autonomous vehicles, autonomous drones, and the like, require position, orientation, and dimensions of objects in their environment in order to perform tracking, navigation, collision avoidance, and the like.

Autonomous vehicle systems may include an array of different types of sensors to detect, track and identify objects and/or attributes of objects. For instance, sensors, such as LIDAR and RADAR, ultrasonic transducers, depth cameras, and the like can provide three-dimensional information about objects in an environment and sensors such as conventional cameras can provide two-dimensional information about the environment. For instance, a LIDAR system may have a light emitter and a light sensor, with the light emitter including one or more lasers that direct highly focused light toward an object or surface which reflects the light back to the light sensor. Measurement of the LIDAR system may be represented as three-dimensional LIDAR data having coordinates (e.g., Cartesian, polar, etc.) corresponding to positions or distances captured by the LIDAR system. For example, the LIDAR data may include point cloud data comprising a plurality of points in the environment. In some instances, LIDAR sensors can generate a large amount of range measurements within a short amount of time (e.g., 1000-100000 range measurements every 0.1 seconds). Similarly, RADAR systems are known to generate point cloud data about 3D objects or features in the environment. In contrast, image capture devices may provide 2D image data, such as RGB image data, greyscale image data, or otherwise, about the environment.

In implementations of this disclosure, point cloud data, e.g., from a LIDAR system or a RADAR system, and 2D image data may be used to create a three-dimensional representation of an object in an environment of the autonomous vehicle. One example three-dimensional representation is a three-dimensional bounding box. A three-dimensional bounding box may be a minimum volume cuboid which encompasses an object. The three-dimensional bounding box provides information about spatial location, orientation, as well as size for the object it contains. For example, an autonomous system can use this information for tracking, navigation, and collision avoidance.

According to embodiments of this disclosure, a machine learning algorithm is applied to the image data and the point cloud data, to estimate parameters for a three-dimensional bounding box associated with one or more objects in the environment. For instance, a first feature vector associated with the image data, for example, associated with a cropped image corresponding to the object of interest, and a second feature vector associated with the point cloud data may be input to the machine learning algorithm. The machine learning algorithm may output parameters of the three-dimensional bounding box. The parameters may include eight points in a coordinate system, the eight points representing the eight corners of the three-dimensional bounding box. An example machine learning algorithm used to recover the parameters is an artificial neural network (ANN), which may be a Convolutional Neural Network (CNN).

In some implementations, the feature vector associated with the image data may be extracted from a residual network and/or the feature vector associated with the point cloud data may be extracted from a deep neural network configured to process point cloud data. For example, the feature vector associated with the image data may be concatenated with the feature vector associated with the point cloud data before being passed through a further machine learning algorithm.

Also in implementations of this disclosure, per-point data may be considered to determine the three-dimensional bounding box. For instance, known deep learning networks used to process point cloud data may consider each point individually before combining information about individual points, e.g., using max-pooling, average pooling, or the like. In implementations, however, feature vectors are determined for each point in the point cloud, and these feature vectors may be input to a machine learning algorithm along with the feature vector associated with the image data and the feature vector associated with the (global) point cloud. In this manner, the algorithm may determine, for each point in the point cloud, a plurality of parameters estimating attributes of the bounding box. For instance, for each point in the point cloud, implementations of this disclosure may determine an offset for each corner of the three-dimensional bounding box, relative to the point. Determining offsets relative to each point may provide improved simplicity, functionality and/or reliability. In addition to calculating these offsets, the machine learning algorithm may also determine a confidence value associated with the offsets for each point. In some examples, the point and its corresponding offsets associated with the highest confidence value may be chosen to define the three-dimensional bounding box.

In some implementations, the machine learning algorithm may be trained to determine the confidence values. In some implementations, the ANN may be trained in a supervised manner using data indicating whether a point is in the three-dimensional bounding box or outside the three-dimensional bounding box. In other implementations, the ANN may be trained in an unsupervised manner using a regression loss function for the three-dimensional bounding box.

The three-dimensional bounding box may be used by a system, such as an autonomous drone, a fully- or semi-autonomous vehicle system, or some other system for tracking the object, for assisting in navigation, and/or for collision avoidance. Other uses for the three-dimensional bounding box may also be apparent to those having ordinary skill in the art with the benefit of this disclosure. More details are provided below with reference to FIGS. 1-6.

Turning to FIG. 1, an environment 100 may include various objects. For exemplary purposes, one such object in the environment 100 is a vehicle 102. The environment 100 is associated with a coordinate system 104. The coordinate system 104 may be either global or local. In a global coordinate system, any point expressed in the coordinate system 104 is an absolute coordinate. Alternatively, in a local coordinate system points are expressed relative to an arbitrarily defined origin (such as a center of an autonomous vehicle as it travels through the environment), which may move in a global coordinate system.

Three-dimensional data associated with environment 100 may be generated by a three-dimensional sensor such as a LIDAR system (not illustrated). As noted above, a LIDAR system may output LIDAR data, e.g., one or more point clouds, comprising a set of data points representing external surfaces of objects in the environment. For example LIDAR data represented by reference numeral 106 includes a point cloud 108 including a plurality of points associated with the vehicle 102. Although the point cloud 108 is described as being generated by a LIDAR sensor, the point cloud may include points from one or more LIDAR sensors, RADAR sensors, and/or other three-dimensional sensors. For instance, the point cloud 108 may include data combined or fused from one or more LIDAR sensors, one or more RADAR sensors, and/or one or more other three-dimensional sensors to provide information about the environment 100, such as, but not limited to, depth cameras, ultrasonic transducers, phased array radar, and the like. Each point in the point cloud may be represented by an image coordinate system, such as by a three-dimensional coordinate, e.g., (x, y, z).

As also illustrated in FIG. 1, in addition to the point cloud information, an image 110 of the environment 100 may be captured by at least one image capture device (not shown). The image 110 includes image data. For exemplary purposes, the image capture device may be a camera. However, other image capture devices are contemplated, such as red, green, blue, depth (RGBD) cameras, stereo cameras, and the like. In example embodiments, each pixel in the image 110 is represented by an image coordinate system as a two-dimensional coordinate, e.g., (u, v). Upon capturing the image 110, the vehicle 102 is represented as a vehicle image 112 in the image 110. Once image data is received from an image capture device, various algorithms (such as Single Shot Detector Multibox, Fast-CNN, Faster-R CNN, overfeat, region based fully-connected networks, etc.) may be applied to identify objects in the image, and in some implementations, two-dimensional bounding boxes. These algorithms may be selected to only identify certain object classes. For example, the algorithm may detect only cars, pedestrians, animals, or any combination thereof, though detection of any number of object classes is contemplated. As illustrated in FIG. 1, such an algorithm has detected an object, here, the vehicle, and has identified a corresponding two-dimensional bounding box 114. The two-dimensional bounding box 114 is rectangular and is dimensioned and positioned so as to completely encompass the vehicle image 112 within the image 110. In an alternate embodiment, the image 110 is captured by at least one stereo camera, RGBD camera, and/or depth camera. Use of multiple cameras may allow for recovery of depth information through the use of multiple view geometry. In such embodiments, depth information from stereo or RGBD cameras is used to aid detection of objects in image 110 for segmenting the image 110 and creating the two-dimensional bounding box 114.

Figure 2:
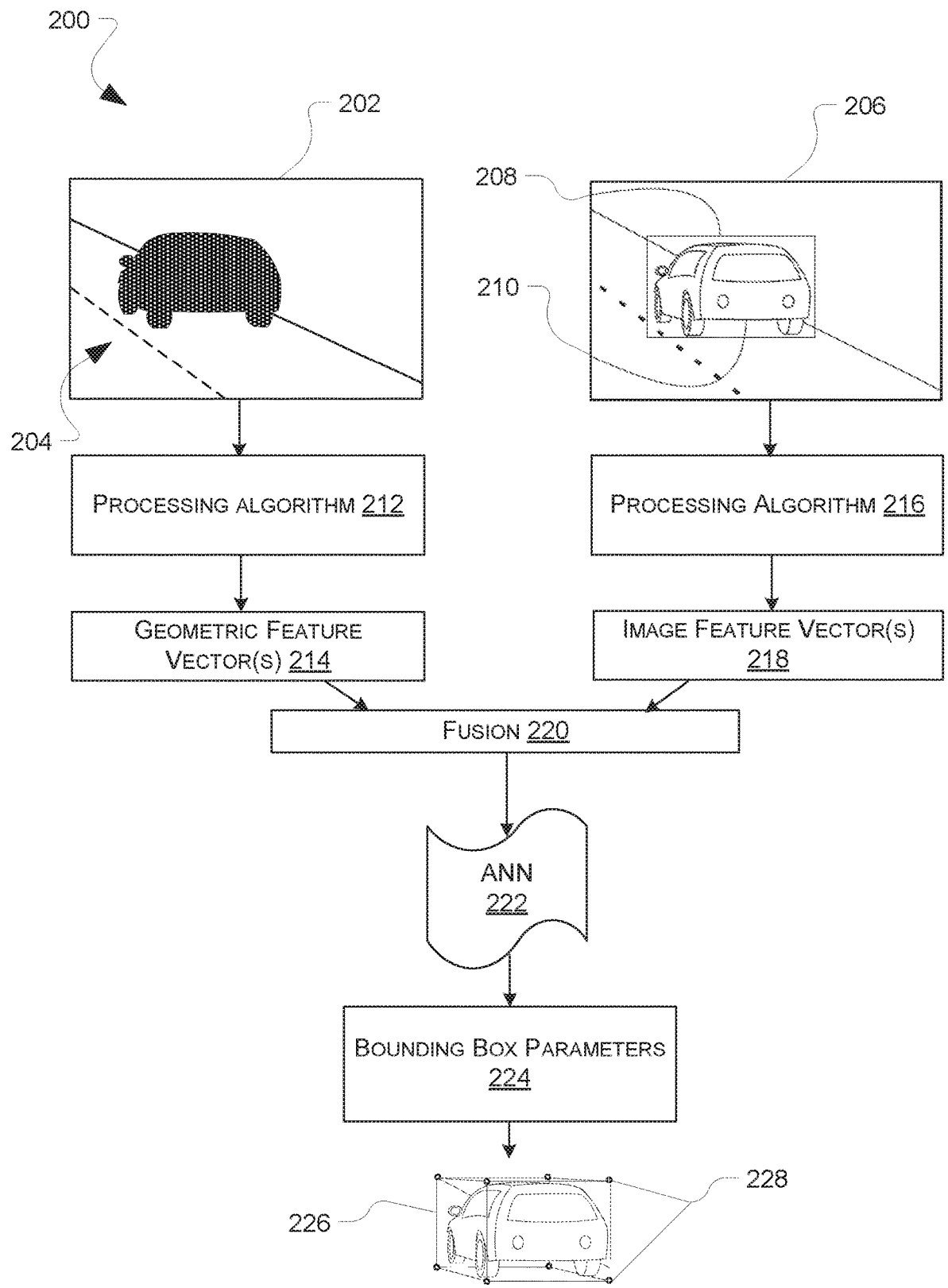
FIG. 2 is a graphical representation of an example process by which a two-dimensional image and a point cloud are run through a neural network to determine parameters of a three-dimensional bounding box.

In implementations of this disclosure, the point cloud 108 and the image 110, and more specifically, the vehicle image 112 in the bounding box 114, may be used to create a three-dimensional bounding box 116. The three-dimensional bounding box 116 may be dimensioned, positioned, and oriented so as to completely encompass the vehicle 102 such that the three-dimensional bounding box 116 has a minimal volume. Attributes of the three-dimensional bounding box 130 may be defined relative to the coordinate system 104, relative to one or more points in the point cloud, and/or relative to some other coordinate system. For example, in implementations of this disclosure, a three-dimensional bounding box may be defined as eight points in the three-dimensional space having x, y, and z coordinates, the eight points corresponding to the eight corners of the three-dimensional bounding box. Methods and techniques for estimating the parameters of the three-dimensional bounding 116 are described in more detail below FIG. 2 illustrates a pictorial representation of a process 200 for determining parameters of a three-dimensional bounding box using image data and point cloud data. In this implementation, three-dimensional data 202 describing an environment includes a point cloud 204. As in the example of FIG. 1, the point cloud 204 includes a plurality of points associated with three-dimensional objects in the environment, and for ease of illustration, the point cloud 204 is illustrated as including only points associated with external surfaces of a single vehicle. In other implementations, however, the point cloud 204 may include points corresponding to external surfaces of other features proximate the vehicle in the environment. Also in this example, an image 206 of the environment is provided. The image 206 consists of two-dimensional data describing the environment. This image data may be processed to define a two-dimensional bounding box 208, to segment a vehicle image 210 of the vehicle from the image 206.

FIG. 2 also schematically illustrates a first processing algorithm 212 configured to receive the point cloud 204. In some implementations of this disclosure, the first processing algorithm 212 may include an artificial neural network (e.g., a convolutional neural network) configured to receive the point cloud and analyze the points. For example, the first processing algorithm 212 may be a PointNet network. PointNet is a deep network architecture that receives raw point cloud data and learns both global and local point features. PointNet has been used conventionally for classification, part segmentation, and semantic segmentation purposes. For purposes of this disclosure, however, the first processing algorithm 212 may be configured to produce a feature vector associated with the point cloud. For instance, when PointNet is used as the first processing algorithm 212, feature vectors may be produced at one of several layers before a prediction layer. The process 200 may extract one or more of these feature vectors, as illustrated at 214. The feature vectors 214 may be purely geometric feature vectors, associated only with the location of the points in the point cloud 206.

A second processing algorithm 216 also is provided in the process 200. The second processing algorithm 216 may be configured to receive the vehicle image 210 and produce one or more appearance feature vectors 218 associated with the vehicle image 210. In some implementations of this disclosure, the second processing algorithm 216 may be embodied as a residual learning network, such as ResNet50, ResNet101, or the like. The second processing algorithm 216 may be configured to produce the feature vector(s) 218 associated with the vehicle image 210. In some examples, the process 200 may extract the feature vector(s) 218 from one of several layers of the residual learning network, before a prediction layer. For instance, the second processing algorithm 216 may be a ResNet-101 CNN and the feature vector 218 may be produced by the final residual block and averaged across feature map locations. The feature vectors 218 may be purely appearance vectors, i.e., without any geometric information.

Accordingly, the first processing algorithm 212 and the second processing algorithm 218 are configured to produce the feature vectors 214, 218, respectively. The feature vectors 214, 218 may correspond to neural network processing features extracted from one or more layers of neural networks comprising the first processing algorithm and the second processing algorithm. In the illustrated embodiment, the feature vectors 214 are geometric feature vectors associated with the point cloud 206 and the feature vectors 218 are appearance feature vectors associated with the vehicle image 210. As illustrated by reference numeral 220, the feature vectors 214, 218 may be combined and input into a further artificial neural network (ANN) 222. For instance, the feature vectors 214, 218 may be concatenated. The ANN 222 may be a multilayer neural network with fully connected layers configured to regress the three-dimensional coordinates of the eight bounding box corners for the point cloud 206 and the image 212. Thus, in example embodiments of this disclosure, the bounding box parameters 224 may comprise a set of eight coordinates, with each of the eight coordinates corresponding to a corner of the cuboid that is the three-dimensional bounding box corresponding to the image object, i.e., the vehicle in this example. An example three-dimensional bounding box 226, defined by eight corners 228, is illustrated in FIG. 2. In another example, the ANN 222 may predict a center location, orientation, and three dimensional extents of such a bounding box. In such a manner, the ANN 222 may constrain the output to retain a rectangular volume shape.

Figure 3:
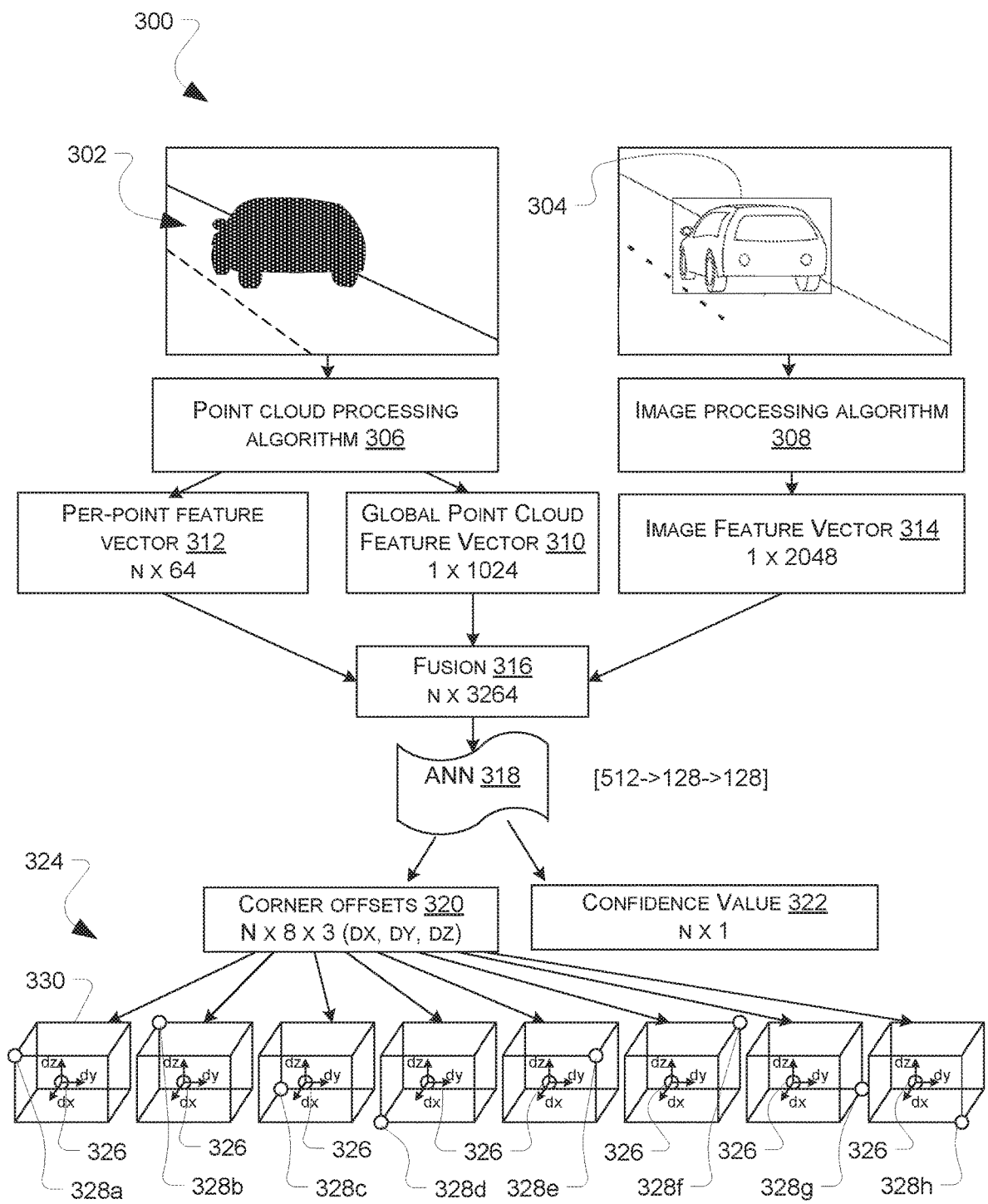
FIG. 3 is a graphical representation of another example process by which a two-dimensional image and a point cloud are run through a neural network to determine parameters of a three-dimensional bounding box.

As just described, the process illustrated in FIG. 2 provides a global architecture that directly regresses coordinates descriptive of a bounding box. FIG. 3 is a pictorial representation of a process 300, which, like the process 200, also determines parameters of a three-dimensional bounding box using a point cloud 302 and a cropped image 304 associated with an object. Unlike the process 200, however, the process 300 is an architecture with increased density that predicts bounding box coordinates for each point in the point cloud 302, instead of a single set of parameters for the point cloud and image pair.

Similar to the process 200, the process 300 provides a first processing algorithm 306 configured to receive the point cloud 302 and a second processing algorithm 308 configured to receive the cropped image 304. In an example implementation of this disclosure, the first processing algorithm 306 may be a PointNet neural network configured to receive a set of unordered three-dimensional points as input. The PointNet neural network is configurable to produce one output for the entire point cloud, as discussed above with regard to FIG. 2, or one output for each input point. Because the PointNet neural network considers the points globally and individually, it is possible to extract from the PointNet neural network a first feature vector 310 associated with the entire point cloud 304 (like in the embodiment of FIG. 2) as well as per-point feature vectors 312, i.e., a feature vector 312 for each of the points in the point cloud 304.

As with the process 200, the image processing algorithm 308 may be a residual neural network, such as ResNet101, from which an appearance feature vector 314 is derived. For example, as also discussed above, in some implementations of this disclosure the appearance feature vector 314 may be extracted from the final residual of the network and averaged across feature map locations.

As illustrated at 316, the per-point feature vector 312, the global point cloud feature vector 310, and the appearance feature vector 314 are combined, e.g., concatenated, and input to an ANN 318. In some implementations, the feature vector associated with each point may be separately combined, e.g., concatenated, with the global point cloud feature vector 310 such that the global point cloud feature vector 310 is concatenated to the feature vector of each point. Unlike the ANN 222 discussed above, the ANN 318 makes a prediction for each input point. More specifically, the ANN 318 may predict, for each point in the point cloud, spatial offsets for each of the eight corners of the bounding box, relative to the point, and determine a confidence score 322 for the predicted offsets. The concept of the spatial offsets for each of the eight corners of the bounding box is illustrated at 324. Specifically, as illustrated, eight offsets 320 are calculated for a given point 326 in the point cloud. Each of the offsets corresponds to a different corner 328a, 328b, . . . , 328h of an estimated three-dimensional bounding box 330.

As will be appreciated from the foregoing, the same bounding box 330, i.e., for the same object, will be estimated for each point in the point cloud 302. And, a confidence value 322 is associated with each point. In implementations of this disclosure, one of the points in the point cloud 302 and its associated offset values 320 may be chosen as the three-dimensional bounding box that best represents the object. In one example, the point and corresponding offsets 320 associated with the highest confidence score 322 is determined to be the three-dimensional bounding box. In other implementations, an average associated with some predetermined number of points may be used to determine the three-dimensional bounding box. For instance, offsets associated with some predetermined number of points having the highest confidence values may be averaged.

The process 300 estimates the offsets relative to each point, because it is generally easier to predict relative objectives than it is to predict absolute objectives. For example, in the case of estimating bounding boxes in an urban environment, the position of the bounding box may vary from 2 m to 100 m from a LIDAR sensor mounted on a vehicle. Prior attempts to define three-dimensional bounding boxes have attempted to force the network to learn to predict wide ranges of values. However, the process 300 instead trains the network to predict corner locations relative to the input points, thereby limiting the distribution of the objective.

In implementations of this disclosure, the confidence values 322 may be determined using a scoring function formulation. In one implementation, the scoring function formulation may be a supervised formulation in which the network is trained to predict, for each point, if the point is inside the predicted bounding box with a binary classification objective, and the score is the predicted probability. In another implementation, the scoring function formulation may be an unsupervised formulation that includes predicting confidence scores and multiplying the regression loss with the confidence. In some implementations, this loss may be optimized by predicting a low confidence instead of minimizing the regression loss. A confidence loss may also be added to penalize low confidence. In some embodiments, the confidence loss may be a log probability with a constant weight factor, such as represented by the following equation:

$$L = L_{reg} * con\, f - \log(con\, f) * w.$$

In this loss equation, w represents an optional weight factor that may be determined through empirical experimentation. Such a weighting may balance the networks pressure to have high confidence, as provided by the logarithmic function, and with the pressure to output a low regression loss. The unsupervised formulation may allow the ANN 318 to determine which point is more likely to produce the correct bounding predictions.

As discussed above, the image and point cloud features are combined, e.g., concatenated, before being passed through the ANN 318 at function 316. The fusion may be a concatenation of the global point cloud feature vector 310, the per-point feature vector 312 and the appearance feature vector 314. In some implementations of this disclosure, a local fusion may also be performed. For example, the per-point feature vector from PointNet may be associated with local appearance information extracted from an intermediate layer of the image processing algorithm 308. Specifically, there may be no clear correspondence between points in the point cloud 302 and attributes (e.g., pixels) in the image 304. In implementations of this disclosure, each point in the point cloud 302 may be projected onto the image plane using a known camera model. A feature patch around the point may be extracted from an intermediate layer of the image processing algorithm 308 and resized to a fixed-size feature vector using bilinear interpolation. The feature patch may then be concatenated with the other feature vectors to be input to the ANN 318.

In the processes of FIGS. 2 and 3, batch normalization may be excluded on each of the layers, including the layers of the image processing algorithms 216, 308 and/or the point cloud processing algorithms 212, 306. Batch normalization has become indispensable in modern neural architecture design because it can effectively reduce the covariance shift in the input data/features. However, it has been discovered in some cases batch normalization may hinder the performance of the network. For instance, batch normalization assumes the input feature map to a layer is normally distributed with some biases and that it is desirable to reduce the covariance shift. However when estimating a bounding box given a point cloud, as in implementations of the present disclosure, the distribution of the input point cloud is clearly not Gaussian. The numerical values of the point locations are used directly to predict the bounding box locations. Normalizing the distribution, such as by using batch normalization, would discard such information, and thus hamper the performance.

According to embodiments of this disclosure, the PointNet architecture may be used as the processing algorithm for processing the point cloud data, because it does not need special preprocessing, such as voxelization or projection, and/or because it is robust against a sparse point cloud. In embodiments of this disclosure, however, some data preprocessing may be desirable. For instance, both the input point cloud and the bounding box objective may be rotated to be centered along the Z-axis. In one implementation, a center of a region of interest, such as a center of a frame of an image captured by the image capture device, may be determined. The center of the region of interest may be then unprojected into the camera frame as a ray and the rigid rotation that would rotate this ray to the z-axis of the camera frame may be found. This rotation may then be applied to both the input point cloud and the bounding box objective. Only those points of the point cloud which lie in the image would be considered (i.e. discarding the remainder from consideration) and brought to the center of some coordinate system. Similarly, the image data may be cropped such that only pixels located within the two-dimensional bounding box of the image data are retained (i.e. discarding the remainder) and the image re-centered such that the cropped image is centered in another image coordinate frame. Accordingly, the input data may be normalized for consideration by the ANN 318.

Figure 4:
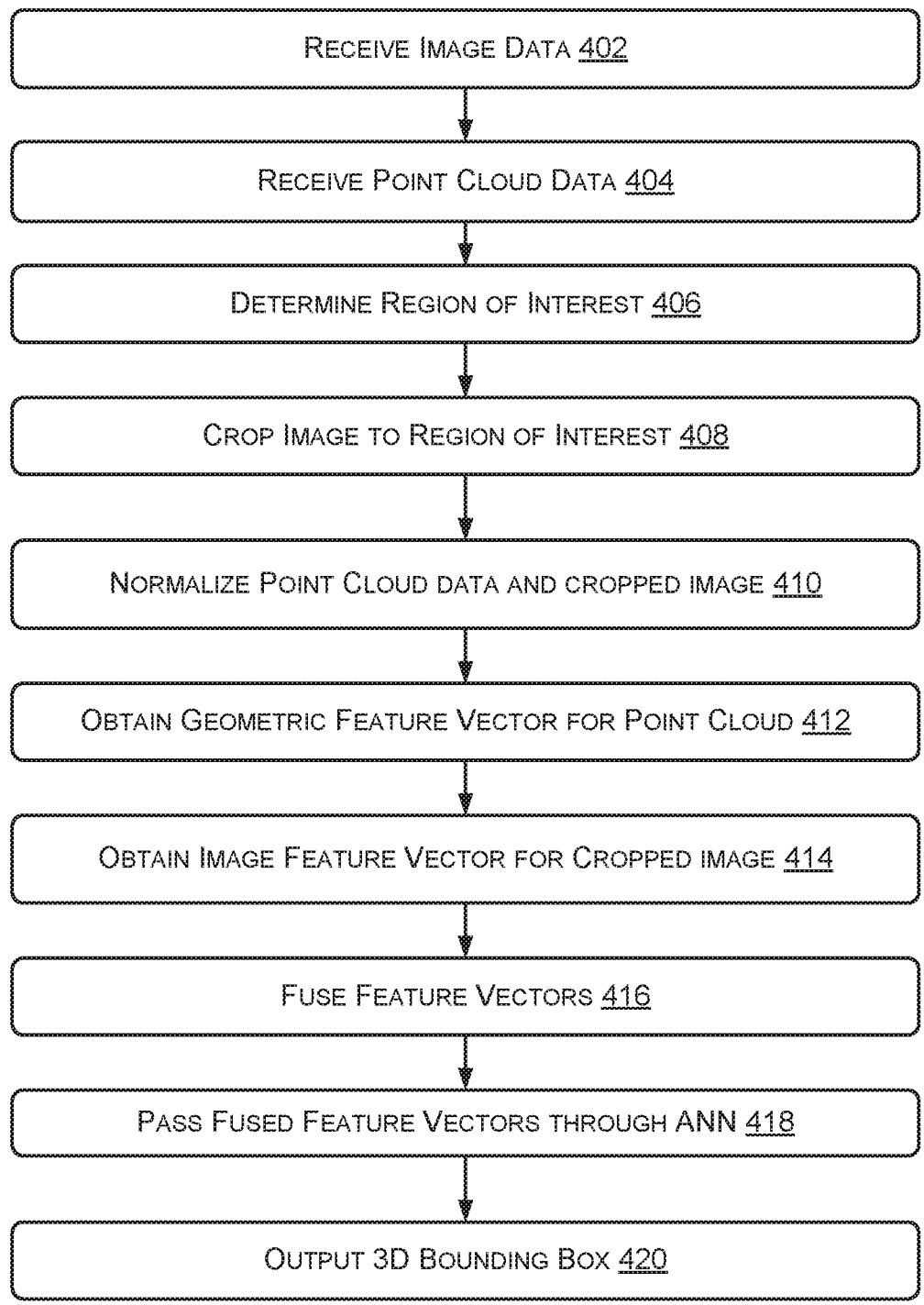
FIG. 4 depicts a flow chart representative of one or more processes for determining a three-dimensional bounding box from a two-dimensional image and point cloud data.
Figure 5:
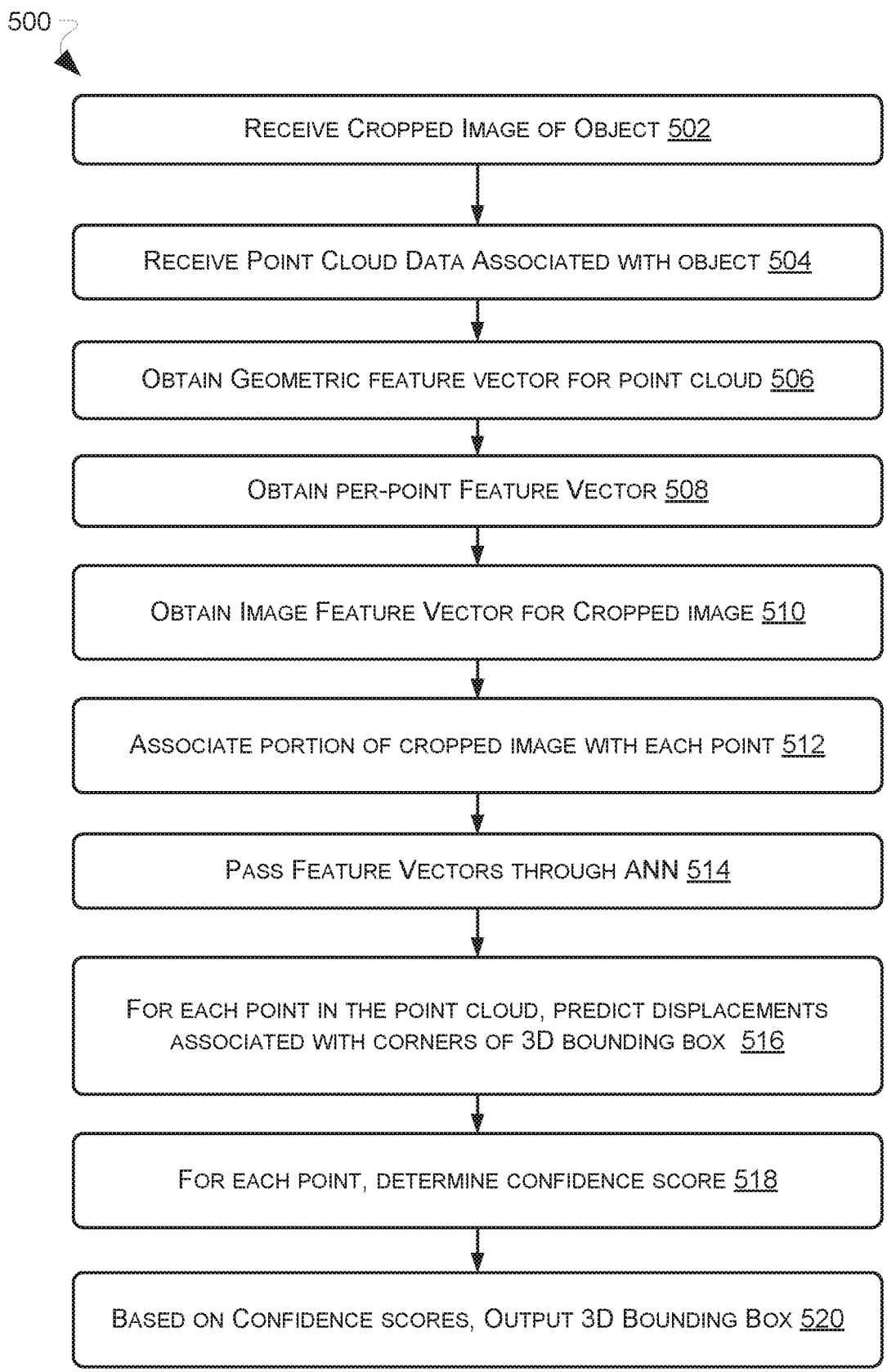
FIG. 5 depicts a flow chart representative of one or more additional processes for determining a three-dimensional bounding box from a two-dimensional image and point cloud data.

FIGS. 4 and 5 are flow diagrams illustrating example methods 400, 500 of determining parameters indicative of three-dimensional bounding boxes. The methods 400, 500 shown in FIGS. 4 and 5 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors (e.g., by one or more processors or other components of a controller), cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

It should be appreciated that the subject matter presented herein may be implemented as a computer process, a computer-controlled apparatus, a computing system, or an article of manufacture, such as a computer-readable storage medium. While the subject matter described with respect to the methods 400, 500 are presented in the general context of operations that may be executed on and/or with one or more computing devices, those skilled in the art will recognize that other implementations may be performed in combination with various program/controller modules. Generally, such modules include routines, programs, components, data structures, and other types of structures that perform particular tasks or implement particular abstract data types.

Those skilled in the art will also appreciate that aspects of the subject matter described with respect to the methods 400, 500 may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

As shown in FIG. 4, an example method 400 of determining a three-dimensional bounding box may include, at 402, receiving image data, and at 404, receiving point cloud data. As detailed above, the image data may comprise output from a conventional image capture device, such as an RGB camera, and the point cloud data may comprise output from a three-dimensional sensor, such as a lidar, radar sensor, depth camera (e.g. structured light or time of flight), or the like. In implementations of this disclosure, the image data provides a two-dimensional description of an environment and the point cloud data provides a three-dimensional description of that environment. Because the image data received at 402 and the point cloud data received at 404 are descriptive of the same environment, the two types of data may be correlated, for example, to account for an offset of the camera and the sensor used to obtain the data. Such an offset may be defined by a relative pose transformation.

The example method 400 also includes, at 406, determining a region of interest in the environment. For example, the environment described by the image data in the point cloud data may include a number of objects. For example, the environment may be an urban environment, which may include cars, pedestrians, bicyclists, buildings, road signs, and/or the like, and at 406, a region of interest corresponding to one object in the environment may be identified. As noted above, systems are known that identify objects in the environment, and such systems can be used to determine the region of interest. In some example implementations, a two-dimensional bounding box may be used to define the region of interest at 406. For those images containing multiple regions of interest, the following process may be applied for all such regions of interest either sequentially, or in parallel.

At 408, the example method 400 also includes cropping the image to the region of interest. Cropping the image in this manner provides a cropped image. For instance, the cropped image may include an image of an object of interest in the environment.

The example method 400 also includes, at 410, normalizing the point cloud data and the cropped image. For example, both the point cloud and the bounding box objective may be cropped (or otherwise altered to leave only the data within the two-dimensional bounding box in the image and related points in the point cloud (e.g., by reprojection using a known transformation between the two sensors)) and rotated to be centered along an axis of the sensors, e.g., a Z-axis.

At 412, a feature vector (e.g., a geometric feature vector) for the point cloud is obtained, and at 414 a feature vector (e.g., an appearance feature vector) for the cropped image is obtained. As described above, the point cloud data may be passed through a processing algorithm such as PointNet and the geometric feature vector may be extracted from a layer of the PointNet neural network. In this example embodiment, the geometric feature vector may be a global feature vector corresponding to the entire point cloud. Similarly, the cropped image may be passed through an image processing algorithm such as ResNet101 and the appearance feature vector may be extracted from a layer of the residual network, such as the final residual block.

At 416 in the example method 400, the geometric feature vector and the appearance feature vector are processed by a function, and at 418 the processed feature vectors are passed through a machine learning algorithm. 416 may include, for example, concatenation of the geometric feature vector in the appearance feature vector. The machine learning algorithm may include an artificial neural network, such as a convolutional neural network and/or a plurality of fully connected layers.

The example method 400 also includes, at 420, outputting parameters descriptive of a three-dimensional bounding box associated with the object of interest. As described above, the three-dimensional bounding box may be a cuboid that completely encloses the object of interest. In this example method 400, the machine learning algorithm directly regresses the three-dimensional coordinates of the eight corners of the three-dimensional bounding box for the point cloud and cropped image.

FIG. 5 illustrates another example method 500 of estimating a three-dimensional bounding box. The method 500 may correspond, in some implementations, with the process 300 illustrated in FIG. 3. According to the method 500, at 502 a cropped image of an object is received and at 504 point cloud data associated with the object is received. As detailed above, the cropped image may be the result of feature identification and/or creation of a two-dimensional bounding box around the object. The point cloud data may be received from a three-dimensional sensor such as from one or more LIDAR, radar, and/or other sensor system configured to output three-dimensional information about objects, e.g., as a point cloud.

The method 500, similar to the method 400 described above, also includes, at 506 obtaining a feature vector (e.g., a geometric feature vector) for the point cloud and, at 510, obtaining an appearance feature vector for the cropped image. Unlike the method 400, however, the method 500 also includes, at 508, obtaining a per point feature vector. As described above in connection with FIG. 3, neural networks for processing unordered point cloud data are known that consider the data on a per point basis, as well as on a global basis. An example of such a neural network is the PointNet neural network. In some example, such per point feature vectors and global feature vectors may be extracted from the same network at different layers.

The method 500 may also include, at 512, associating a portion of the cropped image with each point. In architectures described herein, image data and geometric data are considered together to determine three-dimensional bounding boxes for objects in an environment. However, the architecture may include no clear correspondence between the point cloud and images in the model despite the fact this information may be easily accessible. Thus, at 512, each point in the point cloud may be projected onto an image plane. Once projected, a feature patch may then be extracted around the point at an intermediate layer of the image processing algorithm, and the patch may be resized to a fixed size feature vector using bilinear interpolation. This feature may be concatenated with the global point cloud feature obtained at 506, the per-point feature vector obtained at 508, and the appearance feature vector obtained at 510. In other implementations, the feature patch may be concatenated with the per-point feature vector obtained at 508 prior to processing with the global geometric feature vector for the entire point cloud and the appearance feature vector for the cropped image.

At 514, the feature vectors are passed through a machine learning algorithm, which may be an artificial neural network, such as a convoluted neural network. Because of the inclusion of the per point feature vectors, the convoluted neural network will, for each point, output at 516 the prediction of displacements or offsets associated with corners of a three-dimensional bounding box and at 518, a confidence score. Thus, in this example implementation, for each point in the point cloud, the convoluted neural network will produce eight offset parameters for each point, with each of the eight offset parameters corresponding to a different corner of the three-dimensional bounding box. The confidence scores may be numbers between 0 and 1, and as described above in connection with FIG. 3, the neural network may be trained in either a supervised manner or an unsupervised manner to determine the confidence scores.

Method 500 also includes, at 520, outputting a three-dimensional bounding box based on the confidence scores. In implementations of this disclosure, the three-dimensional bounding box may correspond to the offset parameters associated with the point in the point cloud having the highest confidence score. In other implementations, the three-dimensional bounding box may correspond to an average of offset parameters associated with more than one point in the point cloud. By way of non-limiting example, offset parameters associated with some predetermined number of points, such as points having the highest confidence scores, may be averaged to determine the offset parameters.

Figure 6:
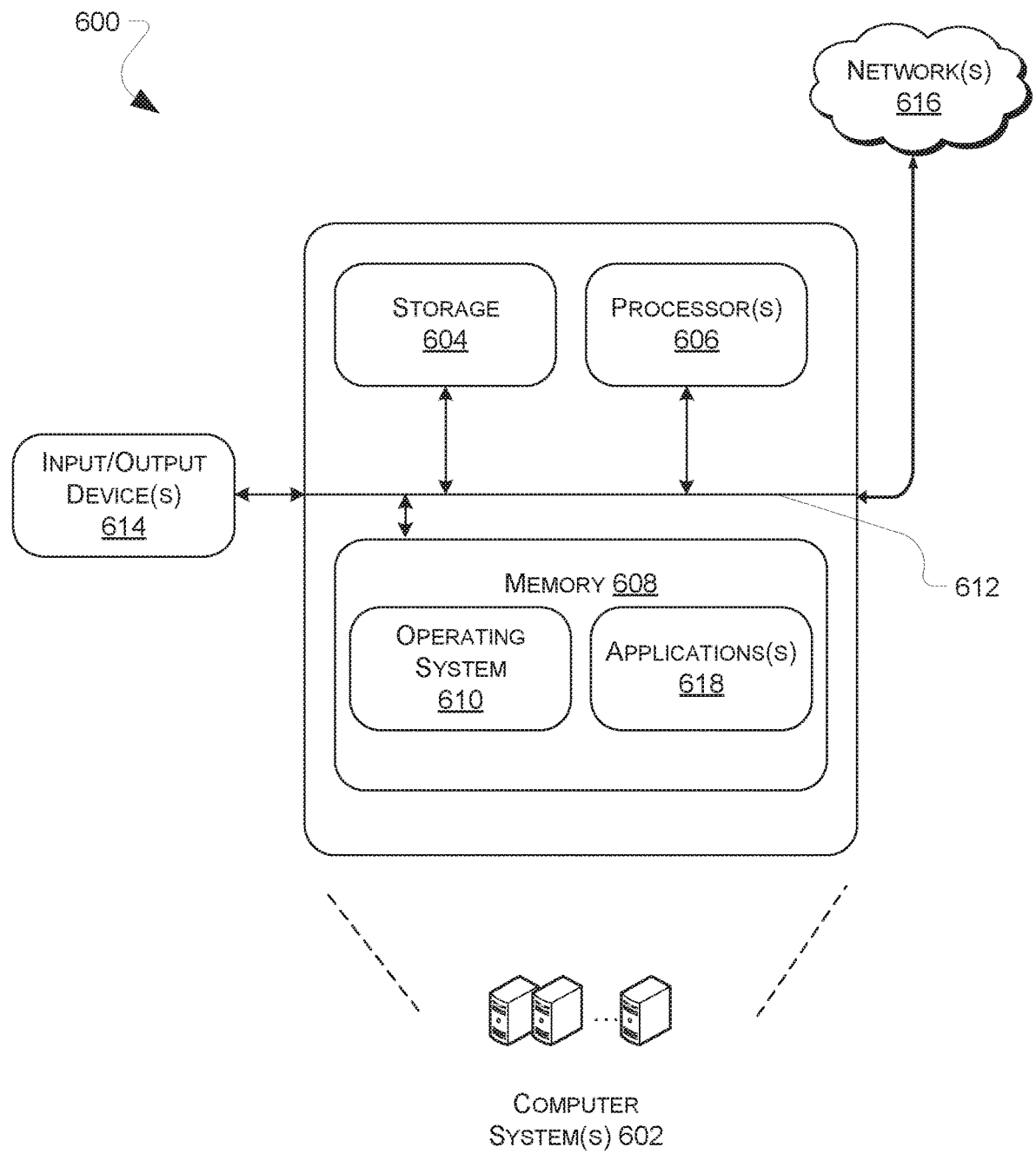
FIG. 6 depicts an example computerized system usable to determine a three-dimensional bounding box from a two-dimensional image and point cloud data.

FIG. 6 illustrates a computerized system 600 on which the invention may be implemented in whole or in part. The computerized system 600 depicts one or more computer systems 602 that comprises storage 604, one or more processor 606, memory 608, and an operating system 610. The storage 604, the processor(s) 606, the memory 608, and the operating system 610 may be communicatively coupled over a communication infrastructure 612. Optionally, the computer system(s) 602 may interact with a user, or environment, via I/O devices 614, as well as one or more other computing devices over a network 616, via the communication infrastructure 612. The operating system 610 may interact with other components to control one or more applications 618.

In some instances, the computer system(s) 602 may implement any hardware and/or software to perform the estimation of three-dimensional bounding boxes as discussed herein.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An exemplary environment and computerized system for implementing the systems and methods described herein is illustrated in FIG. 6. A processor or computer system can be configured to particularly perform some or all of the methods described herein. In some embodiments, the methods can be partially or fully automated by one or more computers or processors. The systems and methods described herein may be implemented using a combination of any of hardware, firmware and/or software. The present systems and methods described herein (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the systems and methods described herein may be directed toward one or more computer systems capable of carrying out the functionality described herein. Example computing devices may be, but are not limited to, a personal computer (PC) system running any operating system such as, but not limited to, OS X™, iOS™, Linux™, Android™, and Microsoft™ Windows™. However, the systems and methods described herein may not be limited to these platforms. Instead, the systems and methods described herein may be implemented on any appropriate computer system running any appropriate operating system. Other components of the systems and methods described herein, such as, but not limited to, a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or written to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, a relational database management system (RDBMS) can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which may allow software and data to be transferred from the removable storage unit to computer system.

The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device may also include output devices, such as but not limited to, a display, and a display interface. The computing device may include input/output (I/O) devices such as but not limited to a communications interface, cable and communications path, etc. These devices may include, but are not limited to, a network interface card, and modems. Communications interface(s) may allow software and data to be transferred between a computer system and one or more external devices.

In one or more embodiments, the computing device may be operatively coupled to an automotive system. Such automotive system may be either manually operated, semi-autonomous, or fully autonomous. In such an embodiment, input and output devices may include one or more image capture devices, controllers, microcontrollers, and/or other processors to control automotive functions such as, but not limited to, acceleration, braking, and steering. Further, communication infrastructure in such embodiments may also include a Controller Area Network (CAN) bus.

In one or more embodiments, the computing device may be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and may be applicable to any application utilizing machine vision.

In one or more embodiments, the present embodiments can be practiced in the environment of a computer network or networks. The network can include a private network, or a public network (for example the Internet, as described below), or a combination of both. The network may include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What we claim is:

1. A computer-implemented method comprising:
   receiving sensor data comprising a plurality of measurements of an environment;
   inputting at least a portion of the sensor data into a machine learned model;
   determining, as a first feature vector and based at least in part on a first portion of the machine learned model, a first set of values associated with a measurement of the plurality of measurements;
   determining, as a second feature vector and based at least in part on a second portion of the machine learned model, a second set of values associated with the plurality of measurements;
   receiving image data from an image sensor;
   determining, as a third feature vector and based at least in part on a third portion of the machine learned model, a third set of values associated with a portion of the image data;
   combining, as a combined feature vector, the first feature vector, the second feature vector, and the third feature vector;
   inputting the combined feature vector into a fourth portion of the machine learned model; and
   receiving, from the fourth portion of the machine learned model, information associated with an object represented in the sensor data.

2. The computer-implemented method of claim 1, wherein determining, as the third feature vector, the third set of values associated with the portion of the image data comprises:
   determining a portion of the image data associated with the object;
   determining, based at least in part on the portion of the image data associated with the object, a subset of the sensor data associated with the portion of the image data;
   inputting the portion of the image data into a fifth fourth portion of the machine learned model; and
   receiving, from the fifth portion of the machine learned model, an appearance feature vector;
   wherein combining the first feature vector, the second feature vector, and the third feature vector comprises combining the appearance feature vector with the first feature vector and the second feature vector,
   wherein inputting the sensor data into the machine learned model comprises inputting the subset of sensor data into the machine learned model, and
   wherein the information associated with the object is further based on the appearance feature vector.

3. The computer-implemented method of claim 1, wherein:
   combining the first feature vector and the second feature vector comprises concatenating the first feature vector and the second feature vector.

4. The computer-implemented method of claim 1, wherein the plurality of measurements comprises a plurality of Light Detection and Ranging ("LiDAR") measurements.

5. The computer-implemented method of claim 1, wherein the information associated with the object comprises a plurality of points that define a three-dimensional bounding box associated with the object.

6. The computer-implemented method of claim 5, wherein the sensor data comprises point cloud data, the computer-implemented method further comprising:
   determining, for a first point in the point cloud data, a first set of offsets corresponding to first estimated positions of corners of a first candidate three-dimensional bounding box relative to the first point; and
   determining a confidence value associated with the first candidate three-dimensional bounding box.

7. The computer-implemented method of claim 6, further comprising:
   determining, for a second point of the plurality of points, a second set off offsets and a second confidence score, the second set of offsets corresponding to second estimated positions of the corners of a second candidate three-dimensional bounding box relative to the second point,
   wherein the plurality of points that define the three-dimensional bounding box correspond to the first estimated positions based on the first confidence score being higher than the second confidence score.

8. The computer-implemented method of claim 1, wherein the third portion of the machine learned model is trained using a regression loss.

9. The computer-implemented method of claim 1, further comprising:
   controlling an autonomous vehicle to navigate relative to the object.

10. The computer-implemented method of claim 1, wherein:
    the first feature vector comprises a local feature vector extracted from a first processing algorithm; and
    the second feature vector comprises a global feature vector extracted from a second processing algorithm.

11. A system comprising:
    one or more processors; and
    non-transitory computer-readable media storing instructions that, when executed by the one or more processors, cause the system to:
    input sensor data into a machine learned model, the sensor data including a plurality of measurements;
    determine, based on a first portion of the machine learned model, a first feature vector, the first feature comprising a first set of values associated with a first measurement of the plurality of measurements;
    determine, based on a second portion of the machine learned model, a second feature vector, the second feature vector comprising a second set of values associated with the plurality of measurements;

receive image data from an image sensor;

determine, based on a third portion of the machine learned model, a third feature vector, the third feature vector comprising a third set of values associated with a portion of the image data;

combine the first feature vector, the second feature vector, and the third feature vector as a combined feature vector;

input the combined feature vector into a fourth portion of the machine learned model; and receive, from the fourth portion of the machine learned model, information associated with an object represented in the sensor data.

12. The system of claim 11, wherein the instructions to determine the third feature vector comprise further instructions to further cause the system to:

determine a portion of the image data associated with the object;

determine a subset of the sensor data associated with the portion of the image data;

input the portion of the image data into a fifth portion of the machine learned model; and receive, from the fourth portion of the machine learned model, an appearance feature vector comprising a third set of values;

wherein combining the first feature vector, the second feature vector, and the third feature vector comprises combining the appearance feature vector with the first feature vector and the second feature vector, and wherein the information associated with the object is further based on the appearance feature vector.

13. The system of claim 11, wherein the information associated with the object comprises a plurality of points that define a three-dimensional bounding box associated with the object.

14. The system of claim 13, wherein the sensor data comprises point cloud data, the instructions further causing the system to:

determine, for a first point in the point cloud data, a first set of offsets corresponding to estimated positions of corners of a candidate three-dimensional bounding box relative to the first point; and determine a confidence value associated with the first candidate three-dimensional bounding box.

15. The system of claim 14, wherein the plurality of points that define the three-dimensional bounding box is based at least in part on the estimated positions and the confidence value.

16. A system comprising:

an autonomous vehicle configured to operate in an environment;

a sensor configured to generate point cloud data corresponding to the environment;

an image sensor configured to capture image data of the environment;

one or more processors: and non-transitory computer-readable media storing instructions that, when executed by the one or more processors, cause the system to perform acts comprising:

inputting sensor data into a machine learned model, the sensor data including a plurality of measurements;

determining, based on a first portion of the machine learned model, a first feature vector, the first feature comprising a first set of values associated with a first measurement of the plurality of measurements;

determining, based on a second portion of the machine learned model, a second feature vector, the second feature vector comprising a second set of values associated with the plurality of measurements;

receiving image data from the image sensor;

determining, as a third feature vector and based at least in part on a third portion of the machine learned model, a third set of values associated with a portion of the image data;

combining the first feature vector, the second feature vector, and the third feature vector as a combined feature vector;

inputting the combined feature vector into a fourth portion of the machine learned model; and receiving, from the fourth portion of the machine learned model, information associated with an object represented in the sensor data.

17. The system of claim 16, wherein determining the third set of values comprises:

determining a portion of the image data associated with the object;

determining a subset of the sensor data associated with the portion of the image data;

inputting the portion of the image data into a fifth portion of the machine learned model; and receiving, from the fifth portion of the machine learned model, an appearance feature vector comprising a third set of values associated with the image data;

wherein combining the first feature vector, the second feature vector, and the third feature vector comprises combining the appearance feature vector with the first feature vector and the second feature vector, wherein inputting the sensor data into the machine learned model comprises inputting the subset of sensor data into the machine learned model, and wherein the information associated with the object is further based on the appearance feature vector.

18. The system of claim 16, wherein:

the first portion of the machine learned model comprises a first processing algorithm; and the second portion of the machine learned model comprises a second processing algorithm.

19. The system of claim 16, wherein the information associated with the object comprises a three-dimensional bounding box.

20. The system of claim 19, wherein:

the sensor data comprises a point cloud generated by a LiDAR sensor; and the information associated with the object comprises a plurality of offsets associated with a point in the point cloud and a confidence value associated with the plurality of offsets, the plurality of offsets corresponding to corners of the three-dimensional bounding box.

* * * * *

UNITED STATES PATENT AND TRADEMARK OFFICE
CERTIFICATE OF CORRECTION

PATENT NO. : 11,216,971 B2
APPLICATION NO. : 16/557997
DATED : January 4, 2022
INVENTOR(S) : Danfei Xu et al.

It is certified that error appears in the above-identified patent and that said Letters Patent is hereby corrected as shown below:

In the Claims

Column 19, Line 62, in Claim 2, change "fifth fourth" to -- fifth --.

Signed and Sealed this
Twenty-eighth Day of June, 2022

Katherine Kelly Vidal
Director of the United States Patent and Trademark Office